United States Patent [19]
Chorlton et al.

[11] Patent Number: 5,919,915
[45] Date of Patent: Jul. 6, 1999

[54] AZO PYRAZOLONE PIGMENTS

[75] Inventors: Alan Patrick Chorlton, Stockport; James Mason, Rochdale, both of United Kingdom

[73] Assignee: Zeneca Limited, London, United Kingdom

[21] Appl. No.: 08/875,073

[22] PCT Filed: Dec. 5, 1995

[86] PCT No.: PCT/GB95/02832

§ 371 Date: Jul. 17, 1997

§ 102(e) Date: Jul. 17, 1997

[87] PCT Pub. No.: WO96/22333

PCT Pub. Date: Jul. 25, 1996

[30] Foreign Application Priority Data

Jan. 20, 1995 [GB] United Kingdom ............... 9501088

[51] Int. Cl.⁶ ................ C09B 63/00; C09B 29/48; C09B 29/50; C09B 69/04; C08R 5/42
[52] U.S. Cl. ................ 534/784; 534/728; 106/402; 106/496
[58] Field of Search ..................... 534/784, 728

[56] References Cited

U.S. PATENT DOCUMENTS

| | | | |
|---|---|---|---|
| 1,731,150 | 10/1929 | Reber et al. | 534/784 |
| 4,594,411 | 6/1986 | Henning | 534/784 |
| 4,992,495 | 2/1991 | Hari et al. | 534/784 X |
| 5,047,517 | 9/1991 | Deucker | 534/784 |
| 5,457,188 | 10/1995 | Zimmermann I | 534/780 |

FOREIGN PATENT DOCUMENTS

| | | |
|---|---|---|
| 073 982 | 3/1983 | European Pat. Off. . |
| 225 553 | 6/1987 | European Pat. Off. . |
| 397 190 | 11/1990 | European Pat. Off. . |
| 128 906 | 11/1928 | Switzerland . |
| 128 907 | 11/1928 | Switzerland . |
| 128 909 | 11/1928 | Switzerland . |

*Primary Examiner*—Floyd D. Higel
*Attorney, Agent, or Firm*—Pillsbury Madison & Sutro, LLP

[57] ABSTRACT

An azo pyrazolone compound of the formula:

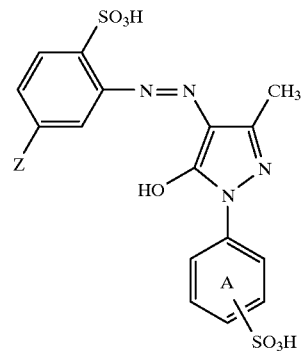

wherein Z represents a substituent selected from Cl, Br, F, $NO_2$, $SO_2R$, $CO_2R$, $NHSO_2R^1$ and $NHCOR^1$ in which R and $R^1$ are hydrocarbyl groups and the sulphonic acid group in ring A is in the 3- or 4-position relative to the pyrazolyl group, said compound being in the form of a salt, and its use as a pigment.

11 Claims, No Drawings

AZO PYRAZOLONE PIGMENTS

This application is the national phase of international application PCT/GB95/02832, filed Dec. 5, 1995 which was designated the U.S.

This invention relates to monoazo pigments and more particularly to greenish-yellow pigments of the azo pyrazolone series.

The use of pigments for the colouring of plastics materials is well known. For the production of yellow colorations, it has been traditional to employ inorganic pigments such as cadmiums and lead chromes but these are now being phased out because of environmental pressures.

Organic pigments that have been proposed as replacements for these inorganic materials include compounds of the formula:

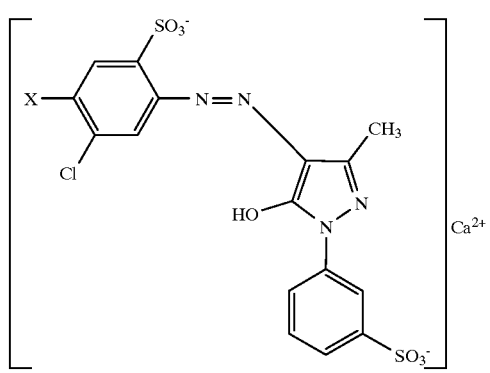

wherein X is Cl (DE-OS 2616981) or $CH_3$ (U.S. Pat. No. 5,047,517).

Other yellow pigments, described in DE-OS 3318073, include compounds of the formula:

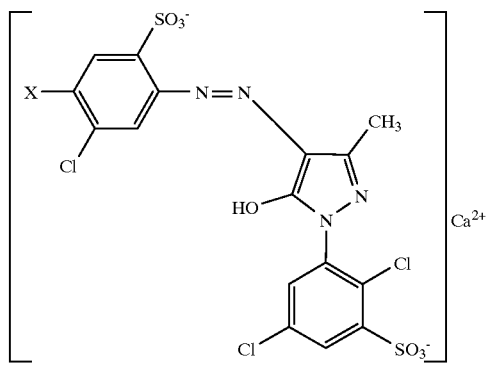

wherein X is again Cl or $CH_3$.

The above mentioned organic pigments are generally suitable for the production of reddish-yellow colorations but it has now been found that greenish-yellow shades having superior light stability, together with excellent heat stability and bleed fastness can be obtained from the compounds hereinafter defined.

Accordingly, the invention provides an azo pyrazolone compound of the formula:

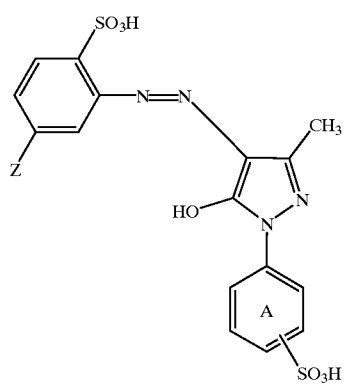

(1)

wherein Z represents a substituent selected from Cl, Br, F, $NO_2$, $SO_2R$, $CO_2R$, $NHSO_2R^1$ and $NHCOR^1$ in which R and $R^1$ are hydrocarbyl and the sulphonic acid group of ring A is in the 3- or 4-position relative to the pyrazolyl group, said compound being in the form of a salt.

The salt of the azo pyrazolone compound of Formula 1 may be a metal salt, for example an alkali metal, alkaline earth metal or heavy metal salt, or a salt of a nitrogenous base, for example a primary, secondary or tertiary amine or quaternary ammonium salt, particularly useful pigments being the salts of barium, strontium, manganese, magnesium, sodium and, especially, calcium.

Preferred compounds of the invention have the formula:

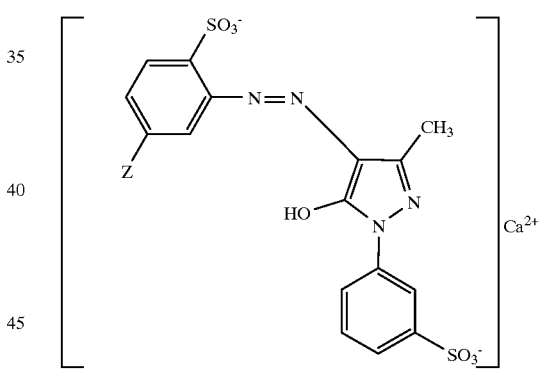

(2)

wherein Z is as defined above, R preferably being an alkyl, for example $C_{1-6}$-alkyl, group and $R^1$ preferably being an aryl, for example phenyl or tolyl, group.

The azo pyrazolone compounds of the invention may be prepared by diazotising a substituted sulphonated aniline of the formula:

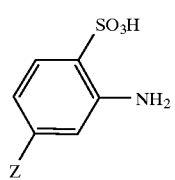

(3)

wherein Z is as defined above and coupling the resulting diazo compound with a sulphonated 3-methyl-1-phenylpyrazol-5-one of the formula:

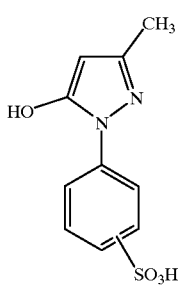

(4)

wherein the sulphonic acid group is in the 3- or 4-position relative to the pyrazolyl group, and converting the resulting monoazo compound to the desired salt form.

The diazotisation and coupling reactions may be performed in a conventional manner appropriate to the classes of compound being used.

The preferred substituted sulphonated aniline for use in preparing the compounds of the invention is 2-amino-4-chlorobenzene sulphonic acid whilst the preferred coupling component is 3-methyl-1-(3'-sulphophenyl)pyrazol-5-one.

It is often convenient to prepare the compound of Formula 1 in the form of a sodium salt and then to convert the sodium salt to, for example, an alkaline earth or heavy metal lake by adding the required amount of a water-soluble alkaline earth or heavy metal salt, usually in the form of an aqueous solution.

Surface active agents and/or organic solvents may optionally be present during the synthesis of the compound of Formula 1 and/or during precipitation of the pigment.

The compounds of the invention, which may be subjected to conventional milling operations and/or thermal treatments in order to provide products of the desired particle size and/or crystal structure, are useful yellow pigments which may be used in conventional manner. In particular, they may be used alone or in conjunction with other pigments for the coloration of plastics materials, for example polyvinyl chloride, polyolefins, polystyrene and ABS where they exhibit excellent properties. The compounds of the invention are also valuable for the pigmentation of surface coatings.

The invention is illustrated but not limited by the following Examples.

EXAMPLE 1

2-Amino-4-chlorobenzene sulphonic acid (4.15 g), deionised water (50 ml) and hydrochloric acid (5.1 ml) were stirred together in a vessel surrounded by an ice-bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in de-ionised water (5 ml) was added all at once and the mixture was stirred at 0–5° C. for 30 mins. Excess nitrite was then removed by adding a few ml of 10% sulphamic acid solution.

3-Methyl-1-(3'-sulphophenyl)pyrazol-5-one (5.4 g) was added to de-ionised water (50 ml) and the pH was adjusted to 6.5 by the addition of 48% sodium hydroxide solution. The solution was then stirred at 0–5° C. and the diazo suspension obtained as described above was added over 10 mins whilst maintaining the pH at 6.5 by the addition of 48% sodium hydroxide solution. The coupling mixture was then stirred overnight at room temperature.

The reaction mixture was then heated to 90° C. and a solution of calcium chloride (32 g $CaCl_2$ in 40 ml water) was added all at once and the mixture stirred for a further 3 hours at 90° C. The mixture was then filtered hot and the product was washed chloride-free with de-ionised water (1000 ml) and dried giving 9.1 g of a greenish-yellow solid.

EXAMPLE 2

2-Amino-4-(toluene-4-sulphonylamino)-benzene sulphonic acid (6.85 g), deionised water (50 ml) and hydrochloric acid (5.1 ml) were stirred together in a vessel surrounded by an ice bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(3'-sulphophenyl)pyrazol-5-one (6.58 g) was added to deionised water (50 ml) and the pH was adjusted to 6.5 by the addition of 48% sodium hydroxide solution. The solution was then stirred at 0–5° C. and the diazo suspension obtained as described above was added over 10 minutes whilst maintaining the pH at 6.5 by the addition of 48% sodium hydroxide solution. The coupling mixture was then stirred overnight at room temperature.

The reaction mixture was then heated to 90° C. and a solution of calcium chloride (30 g $CaCl_2$ in 40 ml water) was added all at once and the mixture stirred for a further 3 hours at 90° C. The mixture was then filtered hot and the product was washed chloride-free with deionised water (1000 ml) and dried giving 12 g of an orange-yellow solid.

EXAMPLE 3

2-Amino-4-benzoylaminobenzene sulphonic acid (5.85 g), deionised water (50 ml) and hydrochloric acid (5.1 ml) were stirred together in a vessel surrounded by an ice bath, followed by sufficient 48% sodium hydroxide solution to form a solution alkaline to Brilliant Yellow paper. The solution was then cooled to 0–50° C. and a further amount (5.1 ml) of hydrochloric acid was added. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(3'-sulphophenyl)pyrazol-5-one (6.58 g) was added to deionised water (50 ml) and the pH was adjusted to 6.5 by the addition of 48% sodium hydroxide solution. The solution was then stirred at 0–5° C. and the diazo suspension obtained as described above was added over 10 minutes whilst maintaining the pH at 6.5 by the addition of 48% sodium hydroxide solution. The coupling mixture was then stirred overnight at room temperature.

The reaction mixture was then heated to 90° C. and a solution of calcium chloride (30 g $CaCl_2$ in 40 ml water) was added all at once and the mixture stirred for a further 3 hours at 90° C. The mixture was then filtered hot and the product was washed chloride-free with deionised water (1000 ml) and dried giving 2.7 g of a greenish-yellow solid.

EXAMPLE 4

2-Amino-4-nitrobenzene sulphonic acid (5.18 g), deionised water (50 ml) and hydrochloric acid were stirred together in a vessel surrounded by an ice bath. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(3'-sulphophenyl)pyrazol-5-one (6.58 g) was added to deionised water (50 ml) and the pH was adjusted to 6.5 by the addition of 48% sodium hydroxide solution. The solution was then stirred at 0–5° C. and the diazo suspension obtained as described above was added over 10 minutes whilst maintaining the pH at 6.5 by the addition of 48% sodium hydroxide. The coupling mixture was then stirred overnight at room temperature.

The reaction mixture was then heated to 90° C. and a solution of calcium chloride (30 g $CaCl_2$ in 40 ml water) was added all at once and the mixture stirred for a further 3 hours at 90° C. The mixture was then filtered hot and the product was washed chloride-free with deionised water (1000 ml) and dried giving 6.0 g of an orange-yellow solid.

EXAMPLE 5

2-Amino-4-chlorobenzene sulphonic acid (4.14 g), deionised water (50 ml) and hydrochloric acid (5.1 ml) were stirred together in a vessel surrounded by an ice bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(4'-sulphophenyl)pyrazol-5-one (5.6 g) was added to deionised water (50 ml) and the pH was adjusted to 6.5 by the addition of 48% sodium hydroxide solution. The solution was then stirred at 0–5° C. and the diazo suspension obtained as described above was added over 10 mins whilst maintaining the pH at 6.5 by the addition of 48% sodium hydroxide solution. The coupling mixture was then stirred overnight at room temperature.

The reaction mixture was then heated to 90° C. and a solution of calcium chloride (32 g $CaCl_2$ in 40 ml water) was added all at once and the mixture stirred for a further 3 hours at 90° C. The mixture was then filtered hot and the product was washed chloride-free with deionised water (1000 ml) and dried giving 4.2 g of a yellow solid.

We claim:

1. An azo pyrazolone compound of the formula:

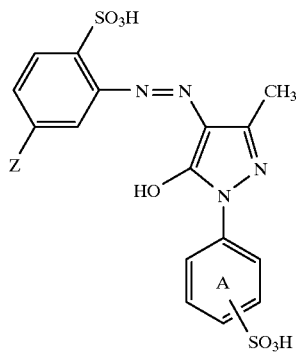

wherein Z represents a substituent selected from $NO_2$, $SO_2R$, $CO_2R$, $NHSO_2R^1$ and $NHCOR^1$ in which R is a hydrocarbyl group, $R^1$ is an aryl group and the sulphonic acid group in ring A is in the 3-position relative to the pyrazolyl group, said compound being in the form of a salt.

2. A compound according to claim 1 wherein the salt is a metal salt or a salt of a nitrogenous base.

3. A compound according to claim 1 wherein Z represents a substituent selected from $SO_2R$, $CO_2R$, $NHSO_2R^1$ and $NHCOR^1$.

4. A compound according to claim 1 wherein Z represents $NHCOR^1$.

5. A compound according to claim 1 wherein $R^1$ is a phenyl or tolyl group.

6. A compound according to claim 1 wherein Z represents $NHCOR^1$, $R^1$ is a phenyl group and the salt is an alkaline earth metal salt or a salt with a primary, secondary or tertiary amine or a quaternary ammonium salt.

7. A compound according to claim 6 wherein the salt is a calcium salt.

8. A compound according to claim 1 having the formula:

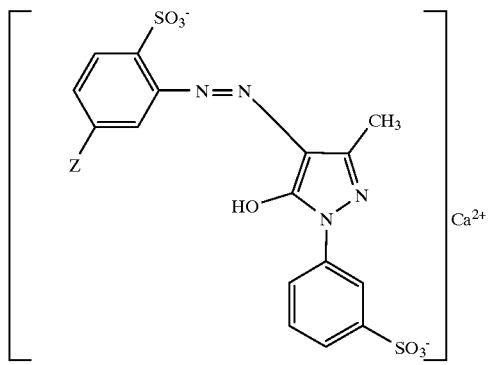

wherein Z is as defined in claim 1.

9. A method for the preparation of an azo pyrazolone compound as defined in claim 1 which comprises diazotising a substituted sulphonated aniline of the formula:

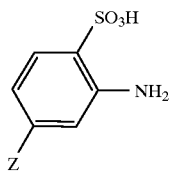

wherein Z is as defined in claim 1 and coupling the resulting diazo compound with a sulphonated 3-methyl-1-phenylpyrazol-5-one of the formula:

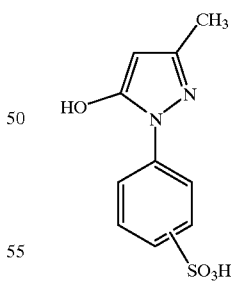

wherein the sulphonic acid group is in the 3-position relative to the pyrazolyl group, and converting the resulting monoazo compound to the desired salt form.

10. A plastic material pigmented with a compound according to claim 1.

11. A surface coating pigmented with a compound according to claim 1.

* * * * *